United States Patent [19]

Savarese

[11] 4,254,698

[45] Mar. 10, 1981

[54] CONTINUOUS CHEESE MAKING MACHINE

[75] Inventor: Joseph Savarese, Boston, Mass.

[73] Assignee: Pozzolanic Limited, Chester, England

[21] Appl. No.: 42,150

[22] Filed: May 24, 1979

Related U.S. Application Data

[63] Continuation-in-part of Ser. No. 827,875, Aug. 26, 1977, abandoned, which is a continuation-in-part of Ser. No. 679,510, Apr. 22, 1976, Pat. No. 4,044,662, which is a continuation-in-part of Ser. No. 528,207, Nov. 29, 1974, abandoned.

[51] Int. Cl.³ .................. A01J 25/06; A01J 25/00; A23C 19/02
[52] U.S. Cl. .......................... 99/460; 99/465; 99/486; 426/36; 426/582; 426/478; 426/491
[58] Field of Search .............. 99/452, 453, 456, 460, 99/466; 426/36, 39, 40, 478, 491, 582; 222/52, 411; 83/408, 858; 366/196

[56] References Cited

U.S. PATENT DOCUMENTS

| | | | |
|---|---|---|---|
| 2,781,269 | 2/1957 | Harper et al. | 99/460 |
| 3,820,688 | 6/1974 | Weiste | 222/411 |
| 3,924,007 | 12/1975 | Driessen et al. | 99/452 |

Primary Examiner—Edward L. Roberts
Assistant Examiner—Timothy F. Simone
Attorney, Agent, or Firm—Friedman, Goodman & Teitelbaum

[57] ABSTRACT

A milk containing liquid is fed at a controlled rate into a tank having rotatable blades defining scoops at an upper portion thereof. In one process, the milk containing liquid precipitates to form ricotta cheese. The precipitation rises in the tank and is scooped into a funnel by the rotating blades. The scooped precipitation flows through the funnel to an exit port in the vessel sidewall. In another process, the milk containing liquid coagulates to form curd and whey which is severed into cubes by the rotating blades and is scooped into the funnel.

10 Claims, 4 Drawing Figures

FIG. 4

CONTINUOUS CHEESE MAKING MACHINE

Cross-Reference to Related Applications

This application is a continuation-in-part of my pending application Ser. No. 827,875 filed on Aug. 26, 1977, abandoned which is a continuation-in-part of application Ser. No. 679,510 filed on Apr. 22, 1976, now U.S. Pat. No. 4,044,662, which is a continuation-in-part application of Ser. No. 528,207 filed on Nov. 29, 1974, now abandoned.

Background of the Invention

1. Field of Invention:

The present invention relates to cheese making and, more particularly, is directed towards continuous processes for producing cheese and towards machines for carrying out such processes.

2. Descrption of the Prior Art:

Generally, processes and machines for producing cheese includes several manual operations at different stages of the process. Various processes and machines, which have been designed to eliminate these manual operations, have been introduced with varying degrees of success. A need has arisen for continuous processess for expeditious production of cheese and for machines for carrying out such processes.

SUMMARY OF THE INVENTION

It is an object of the invention to provide continuous and batch processes for the production of cheese and to provide machines for carrying out such processes.

Another object of the invention is to provide a process and a machine for producing cheese in which a milk containing liquid is fed at a controlled rate into the medial region of a tank at a controlled rate. A pair of rotatable blades, which define scoops, are disposed at an upper region of the tank. The milk containing liquid precipitates to form ricotta cheese which rises in the tank and is scooped into a funnel by the blades. The scooped cheese passes through the funnel and is directed through an exit port in the tank sidewall.

Another object of the invention is to provide a process and a machine for producing cheese in which a milk containing liquid is fed at a controlled rate through an inlet port into the bottom region of a tank. A pair of rotatable blades, which define scoops, are disposed at an upper region of the tank. In a continuous process, the milk containing liquid coagulates and is pushed upwardly in the tank by the incoming milk containing liquid. In a batch process, the milk containing liquid coagulates and is pushed upward in the tank by water introduced through the inlet port. In one such process, the rising coagulation of curd and whey is directed through a mesh of horizontally disposed cutting wires and is severed into elongated bars. The elongated bars, which lie in substantially vertical planes, are pushed towards the center of the tank by the rotating blades through a mesh of vertically disposed cutting wires and are diced. The diced pieces fall into a funnel and are directed through an exit port in the tank sidewall.

Other objects of the present invention will in part be obvious and will in part appear hereinafter.

The invention accordingly comprises the apparatuses, processes and products, together with their parts, steps, elements and inter-relationships, that are exemplified in the following disclosure, the scope of which will be indicated in the appended claims.

BRIEF DESCRIPTION OF THE DRAWINGS

A fuller understanding of the nature and objects of the present invention will become apparent upon consideration of the following detailed description taken in connection with the accompanying drawings, wherein.

DETAILED DESCRIPTION OF THE PREFERRED EMBODIMENT

Figure 1:
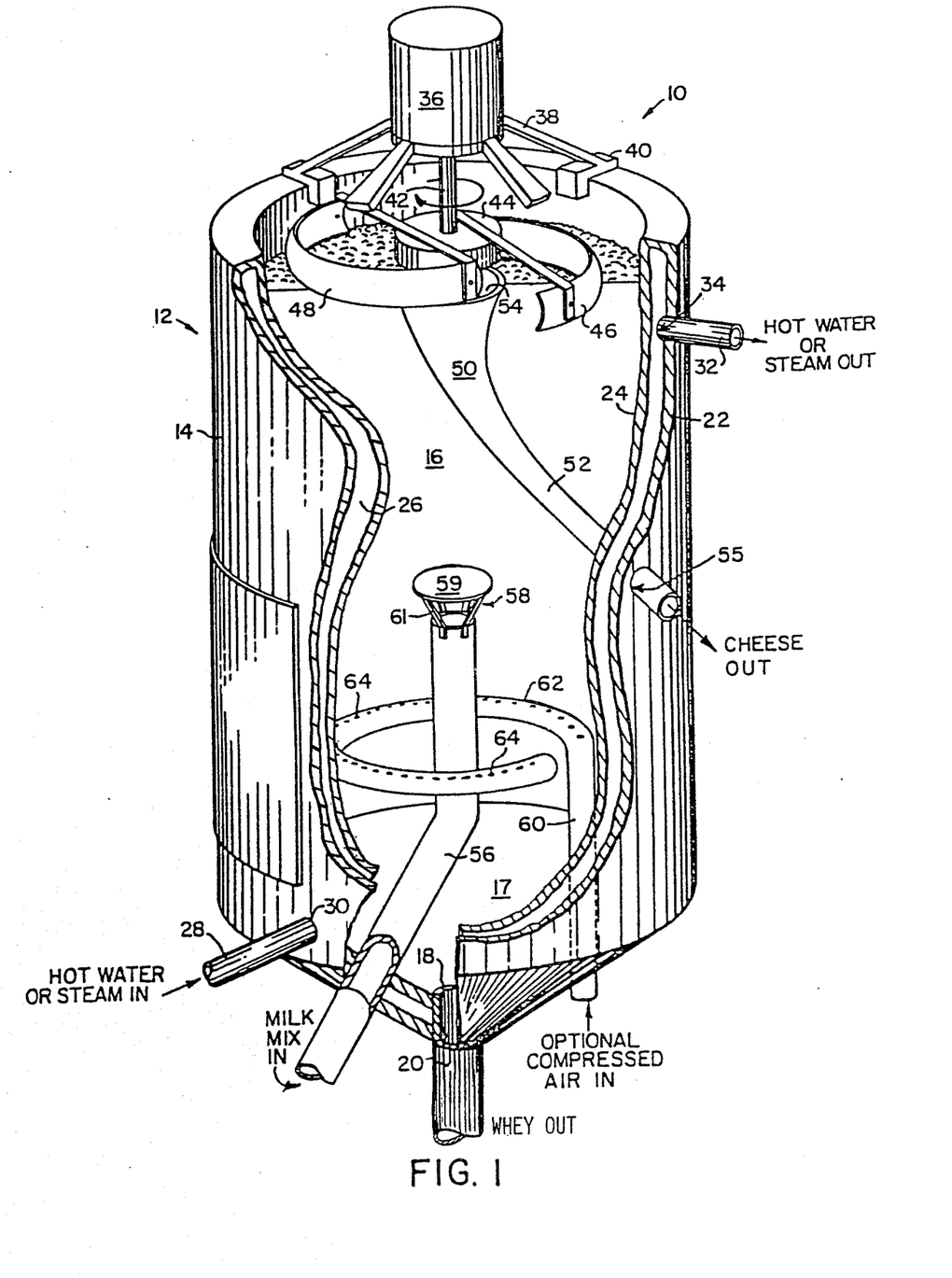
FIG. 1 is a perspective view, partly cutaway, of a machine for continuous and batch production of ricotta cheese.

Referring now to the drawings, particularly FIG. 1, there is shown a machine 10 for continuous and batch processing of a milk containing liquid in order to produce cheese, such as ricotta cheese. Machine 10 comprises a housing 12 in the form of a tank 14, composed for example, of a metal such as stainless steel or aluminum. Tank 14 defines a cylindrical chamber 16 that is opened at its upper end. The lower end of chamber 16 is closed and defines a downwardly tapered frusto-conical draining region 17 that terminates in a drain 18. A conduit 20, which is connected to drain 18, is provided with a control valve 19. In the illustrated embodiment, tank 14 is a double walled cylinder having an exterior sidewall 22 and an interior sidewall 24, a heating cavity 26 being formed between the sidewalls. In alternative embodiments, tank 14 is a single walled cylinder having no heating cavity or a single walled cylinder having a heating jacket. A conduit 28 is connected to an inlet port 30 formed in sidewall 22 and a conduit 32 is connected to an outlet port 34 formed in sidewall 22. A heating fluid, for example hot water or steam, flows into cavity 26 through inlet port 30 and exits through inlet port 34 after circulating in cavity 26. Chamber 16 is characterized by a diameter in the range of 1 foot to 25 feet and an axial length in the range of 3 feet to 25 feet.

A motor 36 is supported at the upper end of tank 14 by means of a plurality of struts 38 that are fixed to flanges 40, which are mounted to the top of the tank. A shaft 42 extends downwardly from motor 36 in registration with the longitudinal axis of chamber 16. A head 44 having a circular periphery is mounted to the free end of shaft 42. Blades 46 and 48, each having a substantially C-shaped profile in right cross section, extend outwardly in a curved path from head 44. One end of each blade 46, 48 is connected to head 44 at diametrically opposite locations, a portion of each blade extending below the lower face of head 44. Blades 46 and 48 are coplanar and define a pair substanially horizontally disposed scoops having an abbreviated Archimedes spiral configuration. The curved path of each blade is in the rotational direction of shaft 42, which rotates at a speed in the range of 1 revolution per minute to 10 revolutions per minute. The locus of the blade tips as the blades rotate defines a circle having a diameter that is slightly less than the diameter of chamber 16.

Figure 2:
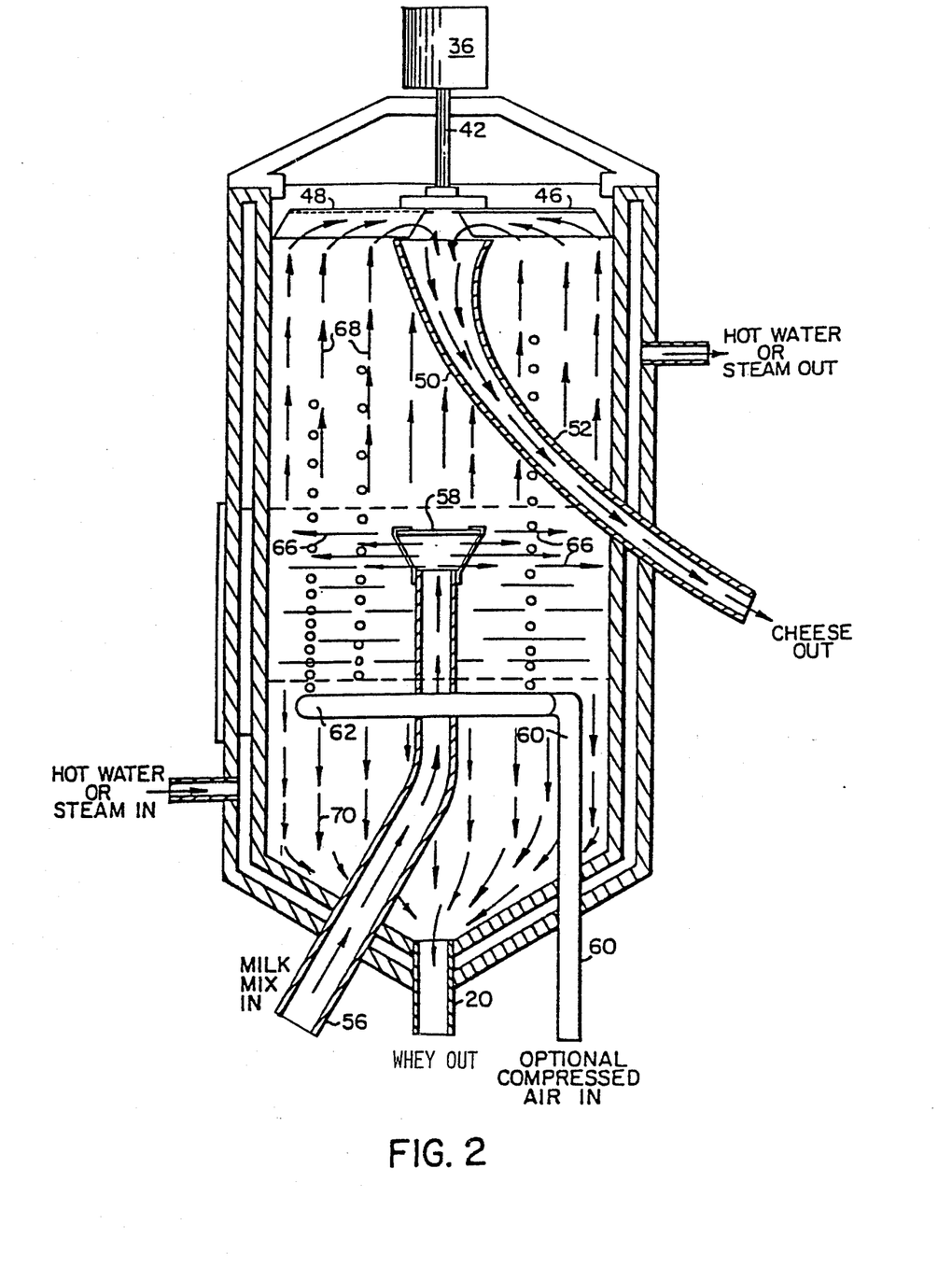
FIG. 2 is a schematic diagram illustrating the continuous and batch cheese making process of the machine shown in FIG. 1.

A funnel 50 having an elongated neck 52 is suitably supported in tank 14. A mouth 54, which is formed at the upper edge of funnel 50, is disposed slightly below and in spaced parallel relationship with lower face of head 44. The upper edge of funnel 50, which defines an annulus, lies in a plane that is substantially coplanar with a plane in which the lower edges of blades 46 and 48 lie, mouth 54 and head 44 being coaxial. The diameter of mouth 54 is in the range of 5% to 60% of the diameter of tank 14, the diameter of head 44 being slightly less than the diameter of mouth 54. Elongated neck 52 slopes downwardly in a substantially curved path towards sidewalls 22, 24 and projects through tank 14 at 55. In an alternative embodiment, neck 52 is abbreviated and a conduit, which is connected to the abbreviated neck, projects through tank 14. A conduit 56, which is operative to supply the milk containing liquid into chamber 16, extends inwardly into tank 14. A nozzle 58 is mounted on the end of conduit 56 that is disposed within chamber 16, the other end of conduit 56 projecting outwardly from sidewall 22. Nozzle 58, for example an assemblage of a plate 59 and struts 61, is disposed coaxially within chamber 16 at a medial region thereof and is operative to radially disperse the milk containing liquid within the chamber for forming curd and whey. A conduit 60, which is operative to supply compressed air into chamber 16, extends inwardly into tank 14. The end section of conduit 60 that lies within chamber 16 defines an annulus 62 formed with a plurality of perforations 64 through which conpressed air enters chamber 16. The other end of conduit 60 projects outwardly from sidewall 22. In alternative embodiments, machine 10 does not include a conduit for supplying compressed air. The continuous processing of the milk containing liquid for producing cheese, for example ricotta cheese, by means of machine 10 is schematically illustrated in FIGS. 2 and 4.

Figure 4:
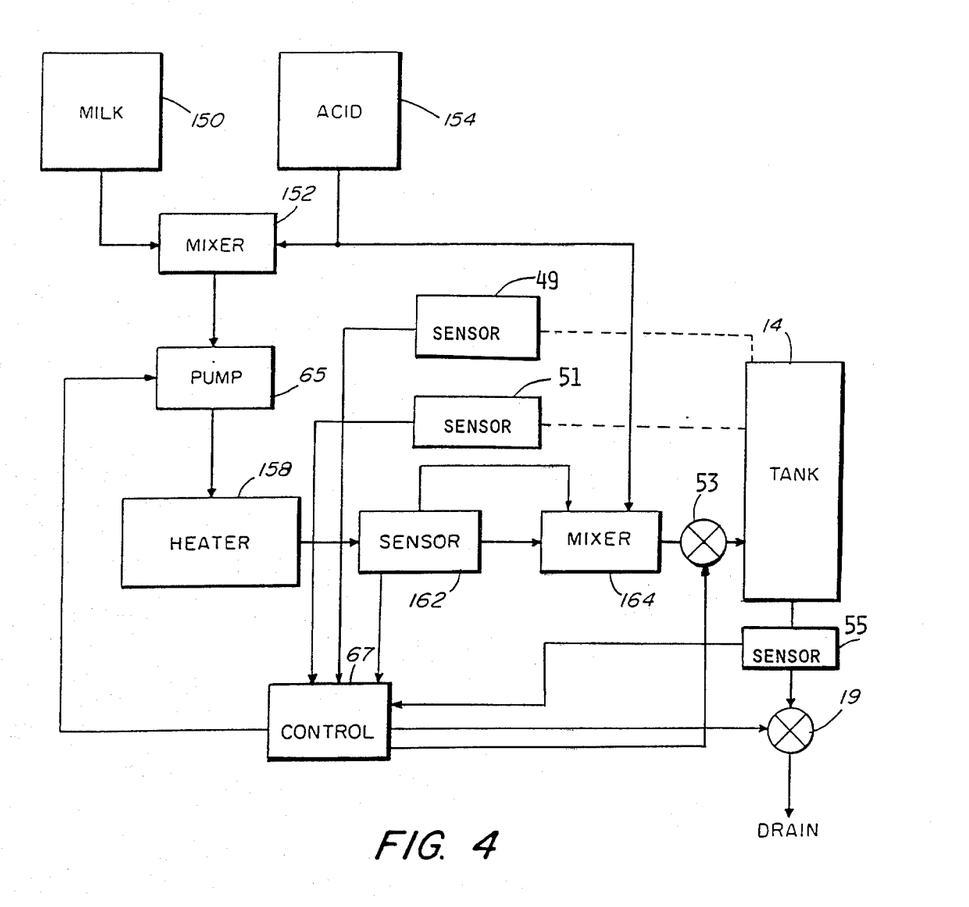
FIG. 4 is a detailed schematic diagram illustrating a continuous process for making ricotta cheese.

Ricotta cheese is prepared from heated milk and other ingredients specified herein by the procedure schematically illustrated in FIG. 4. Milk in a container 150 is mixed in a mixer 152 with an acidifying agent in a container 154. The milk may be warmed or pasteurized or both, and may be clarified or homogenized or both. In the illustrated embodiment, by way of example, milk in container 150 is cow's milk which may be adjusted by separating part of the fat therefrom or by adding thereto one or more of the following: cream, skim milk, concentrated skim milk, nonfat dry milk, water in a sufficient quantity to reconstitute any concentrated skim milk or nonfat dry milk used. The acidifying agents are one or a mixture of two or more of the following: culture of harmless lactic-acid-producing bacteria, a vinegar, fermented whey, lactic acid, and citric acid. Although not shown, salt may be added and sufficient rennet (with or without purified calcium chloride in a quantity of not more than 0.02 percent, calculated as anhydrous calcium chloride, of the weight of the milk) may be added to set the milk. A variable timing pump 65 pumps the milk and acidifying agent mixture to a heater 158. A controller 67, which receives signals from a sensor 162, regulates the flow of the milk and acidifying agent mixture through heater 158. Sensor 162 senses the temperature and acidity of the mixture and generates control signals which are applied to controller 67 and a mixer 164. Controller 67 regulates pump 65 for controlling the flow of the milk and acidifying agent through heater 158 and regulates mixer 164 for controlling the acidity of the mixture entering tank 14.

The temperature and acidity of the milk and acidifying agent mixture entering tank 14 is such that curd separates from the mixture. That is, the acidity and the temperature of the incoming mixture is such that rapid precipitation takes place for forming ricotta cheese. The flow rate of the incoming mixture is controlled by a valve 53. The precipitated curd rises in tank 14 and the whey falls towards drain 18 at the bottom of the tank. The rate of whey flowing out of tank 14 is sensed by a sensor 55 that is regulated by controller 67 which in turn controls valve 19.

The rising curds are scooped into a centrally disposed funnel 50 by blades 46, 48. Initially, valve 19 is closed until the curd reaches a sufficiently high level in tank 14 to be scooped into funnel 50. The rate at which the curd rises is controlled by the incoming mixture and the outgoing whey. That is, when valve 19 is closed, no whey exits from tank 14 and the level in tank 14 rises at a rate which is dependent upon the incoming flow rate of the milk and acidifying agent mixture. When the level of the precipitated solids is within the reach of blades 46, 48, as detected by a sensor 49, for example a float type sensor, valve 19 begins to open. The rate of flow of the precipitated solids through funnel 50 is detected by a sensor 51 which generates signals that are applied to controller 67. Signals generated by sensors 49, 51 and 55 are applied to controller 67 which controls valve 53 at the input of tank 14 for regulating the flow rate of the incoming mixture. The rate of flow into tank 14 is equal to the rate of flow of the precipitated solids through funnel 50 and the whey out of drain 18.

Referring now to FIG. 2, it will be seen that a milk containing liquid is introduced into the medial portion of chamber 16 through a variable timing pump 65, the flow rate being in the range of 5 pounds per hour to 15,000 pounds per hour. A controller 67 is connected to timing pump 65 for controlling the rate at which the milk containing liquid is introduced into chamber 16. Tank 14 is 3 feet in diameter and 6 feet in length. In one example, the milk containing liquid contains whey residue from another cheese making process and selected portions of new milk. In another example, the milk contaning liquid is only new milk. The milk containing liquid in chamber 16 either is preheated before entering the chamber or is heated in the chamber by introduction of hot water or steam into cavity 26. The temperature of the milk containing liquid typically is in the range of 165° F. to 185° F. for ricotta. The milk mixture entering through conduit 56 is dispersed radially by nozzle 58 at the medial portion of chamber 16 as shown at 66. Precipitation of the cheese in the milk containing liquid is enhanced by the addition of a suitable acid such as a critic acid of vinegar. Approximately 15% to 22% of the incoming milk containing liquid precipitates into cheese, the remainder being whey. The acidity and the temperature of the incoming milk containing liquid is such that rapid precipitation takes place for forming ricotta cheese. Preferably, minute particles of the precipitated cheese are formed as the milk containing liquid is dispersed into chamber 16. In a conventional manner, the formed precipitation or ricotta cheese rises in chamber 16 and the whey falls towards drain 18. Initially, valve 19, which is regulated by controller 67, is in a closed position for preventing discharge of liquid through drain 18. Valve 19 remains closed until chamber 16 is substantially filled with the milk containing liquid. As the cheese making process continues, valve 19 is actuated towards its opened position by controller 67, which receives signals generated by sensor 49 that indicate that chamber 16 is substantially filled with the milk containing liquid. The rising precipitated solids of the milk containing liquid of cheese shown at 68 is scooped into funnel 50 by rotating blades 46 and 48, the diameter of mouth 54 being approximately 7 inches. The flow rate of the cheese flowing in funnel 50 is sensed by sensor 51. The cheese scooped into funnel 50 flows downwardly through neck 52 and out of chamber 16. In the case of ricotta, the whey falls, as shown at 70, and exits chamber 16 through drain 20. During the cheese making process, a heating liquid is supplied to cavity 26 through conduit 28 for maintaining the temperature of the mixture within chamber 16 at a temperature in the range of 165° F. to 185° F., preferably 180° F. In the illustrated embodiment, by way of example, compressed air is supplied through conduit 60 for forcing the cheese upwardly in chamber 16. In an alternative embodiment, the cheese rises to the top of chamber 16 without requiring the use of compressed air. The consistency of the cheese is such that the force of gravity is sufficient to cause a continuous flow through funnel 50. The rotational speed of blades 46 and 48 is controlled as a function of the input flow rate of the milk containing liquid and the output flow rate of the cheese and whey. The flow rate of the cheese through funnel 50 is measured by sensor 51 and the flow rate of whey through drain 18 is measured by sensor 56. Controller 67 regulates timing pump 65, valve 53 and valve 19 so that the flow rate of the cheese and whey leaving chamber 16 is substantially equal to the input flow rate of the milk containing liquid during the cheese making process. The machine of FIG. 1 and the process just described is particularly suited for the production of ricotta cheese. A machine 80 for continuous and batch processing of a milk containing liquid for producing other type cheeses such as mozzarella, chedder or Swiss cheese is shown in FIG. 3.

Figure 3:
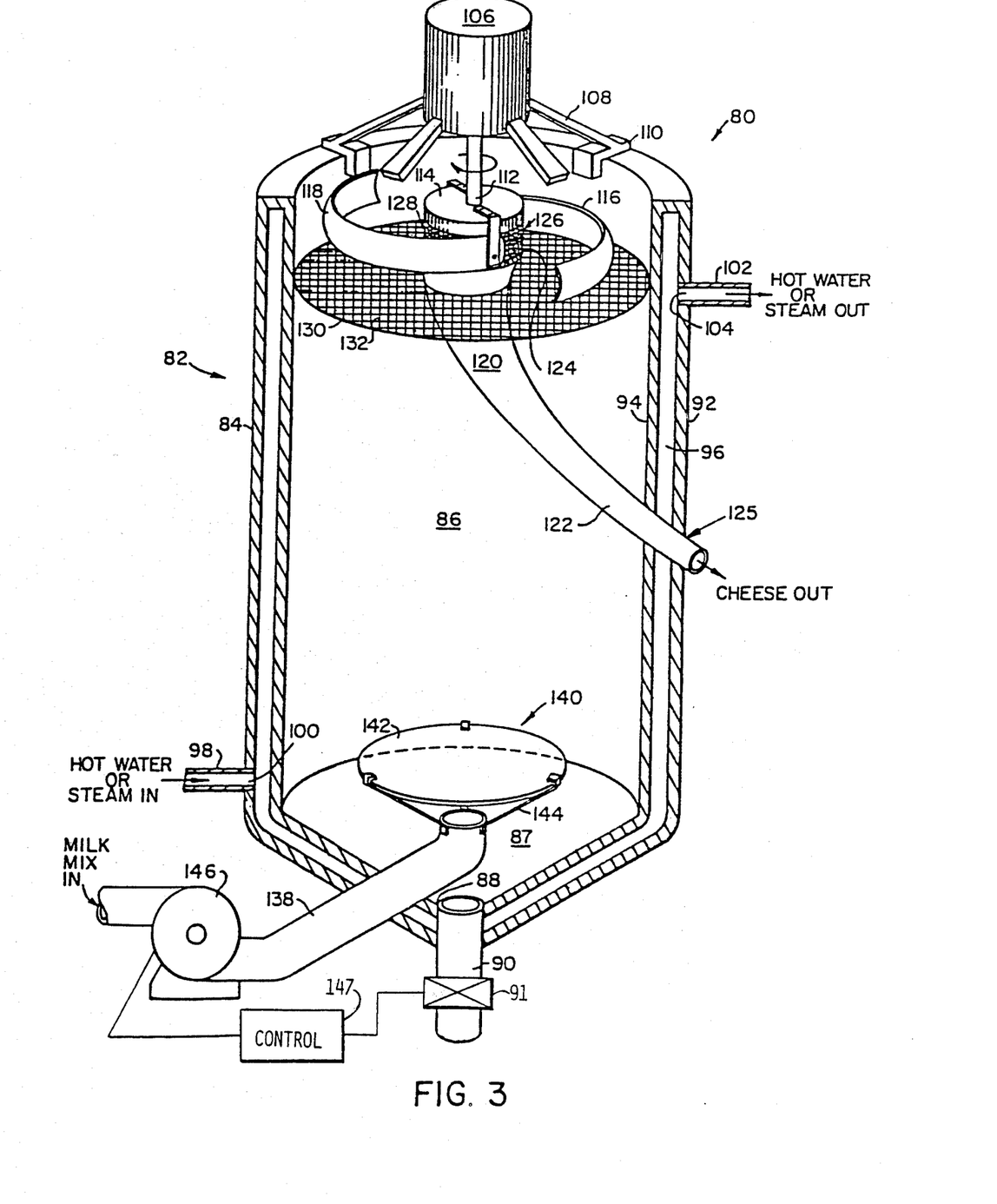
FIG. 3 is a perspective view, partly cutaway, of a machine for continuous and batch processing of cheese.

Referring now to FIG. 3, it will be seen that machine 80 comprises a housing 82 in the form of a tank 84 composed, for example, of a metal such as stainless steel or aluminum. Tank 84 defines a cylindrical chamber 86 that is opened at its upper end. The lower end of chamber 86 is closed and defines a downwardly tapered frusto-conical draining region 87 that terminates in a drain 88. A conduit 90 having a control valve 91 is connected to drain 88. In the illustrated embodiment, tank 84 is a double walled cylinder having an exterior sidewall 92 and an interior sidewall 94, a heating cavity 96 being formed between the sidewalls. In alternative embodiments, tank 84 is a single walled cylinder having no heating cavity or a single walled cylinder having a heating jacket. A conduit 98 is connected to an inlet port 100 formed in sidewall 92 and a conduit 102 is connected to an outlet port 104 formed in sidewall 92. A heating fluid, for example hot water or steam, flows into cavity 96 through inlet port 100 and exits through outlet port 104 after circulating in cavity 96. Chamber 96 is characterized by a diameter in the range of 1 foot to 25 feet and an axial length in the range of 3 feet to 25 feet.

A motor 106 is supported at the upper end of tank 84 by means of a plurality of struts 108 that are fixed to flanges 110, which are mounted to the top of tank 84. A shaft 112 extends downwardly from motor 106 in registration with the longitudinal axis of chamber 86. A head 114 having a circular periphery is mounted to the free end of shaft 112. Blades 116 and 118, each having a substantially C-shaped profile in right cross section, extend outwardly in a curved path from head 114. One end of each blade 116, 118 is connected to head 114 at diametrically opposite locations, a portion of each blade extending below the lower face of head 114. Blades 116 and 118 are coplanar and define a pair of substantially horizontally disposed scoops having an abbreviated Archimedes spiral configuration. The curved path of each blade is in the rotational direction of shaft 112, which rotates at a speed in the range of 1 revolution per minute to 10 revolutions per minute. The locus of the blade tips as the blades rotate defines a circle having a diameter that is slightly less then the diameter of chamber 86.

A funnel 120 having an elongated neck 122, is suitably supported in tank 84. A mouth 124, which is formed at the upper edge of funnel 120, is disposed below and in spaced parallel relationship with the lower face of head 114. The upper edge of funnel 120, which defines an annulus, lies in a plane that is substantially coplanar with the plane in which the lower edges of blades 116 and 118 lie, mouth 124 and head 114 being coaxial. The diameter of mouth 124 is in the range of 5% to 60% of the diameter of tank 84. The diameter of head 114 is substantially equal to the diameter of mouth 124. Elongated neck 122 slopes downwardly in a substantially curved path towards sidewalls 92, 94 and projects through tank 84 at 125. In an alternative embodiment, neck 122 is abbreviated and a conduit, which is connected to the abbreviated neck, projects through tank 84. A mesh 126, in the form of an annulus having a plurality of cutting wires 128, is mounted to the lower peripheral portion of head 114 and the upper peripheral portion of funnel 120, mesh 126 defining a vertically disposed cutting surface. In an alternative embodiment, mesh 126 is other than a plurality of cutting wires, for example a plurality of cutting blades. A mesh 130 in the form of a circular partition having a plurality of cutting wires 132 is mounted about funnel 120 below mouth 124, mesh 130 defining a horizontally disposed cutting surface. In an alternative embodiment, mesh 126 is other than a plurality of cutting wires, for example a plurality of cutting blades. Mesh 126 is operative to encircle the area between head 114 and funnel 120. Mesh 130 is operative to divide chamber 86, the inner edge of mesh 130 being in contiguity with funnel 120 and the outer periphery of mesh 130 being in contiguity with the inner surface of sidewall 94. A conduit 138, which is operative to supply a milk containing liquid into the lower portion of chamber 86, extends inwardly into tank 84 at draining region 87. A nozzle 140 is mounted to the end of conduit 138 that is disposed within chamber 86, the other end of conduit 138 projecting outwardly from sidewall 92. Nozzle 140, for example an assemblage of a plate 142 and struts 144, is disposed coaxially within chamber 86 at a lower region thereof and is operative to radially disperse the milk containing liquid at the bottom of the chamber.

In operation of machine 80, a milk containing liquid is introduced into the bottom of chamber 86 at a controlled rate by means of a variable timing pump 146 which is regulated by a controller 147, the flow rate being in the range of 5 pounds per hour to 15,000 pounds per hour. In one example, tank 84 is 3 feet in diameter and 6 feet in length. The milk containing liquid in chamber 86 either is preheated before entering the chamber or is heated in the chamber by introduction of water or steam into cavity 96. The temperature of the milk containing liquid typically is in the range of 75° F.

to 135° F. for cheeses such as mozzarella, preferably 88° F. The milk containing liquid entering through conduit 56 is dispersed radially by nozzle 140 at the bottom of chamber 86. The temperature of the milk containing liquid is sufficiently high so that rapid coagulation takes place for forming curd and whey. Curdling of the milk containing liquid is enchanced by the addition of a suitable starter and a suitable coagulant such as rennet. During the cheese making process, valve 91, which is regulated by controller 147, is in a closed position for preventing discharge of liquid through drain 88. The milk containing liquid coagulates and is pushed to the top of chamber 86 by the liquid entering through nozzle 140. The curd and whey formed as the mixture coagulates defines a plasticized cheese having a consistency similar to yogurt. The cheese is pushed through mesh 130, cutting wires 132 being spaced apart ⅛ inch to 1 inch. As the plasticized cheese is pushed through mesh 130, it is severed into a series of elongated rectangular or square bars. The elongated bars are scooped by blades 116 and 118 and forced through mesh 126, cutting wires 128 being spaced apart ⅛ inch to 1 inch. The elongated bars pushed through mesh 136 are diced or cut into cubes. The diced cheese which includes approximately 10% curd and approximately 90% whey is passed through funnel 120 and out of tank 84. The rotational speed of blades 116 and 118 is controlled as a function of the input flow rate of the milk containing liquid and output flow rate of the curd and whey through funnel 120. Controller 147 regulates timing pump 146 so that the flow rate of the curd and whey leaving chamber 86 is substantially equal to the input flow rate of the milk containing liquid during the cheese making process. Drain 88 serves as an outlet for residue and cleaning fluids when the system is washed between operations, valve 91 being opened by controller 147 at such times. In a continuous process, the milk containing liquid is continuously introduced into chamber 86. In a batch process, a premeasured amount of milk containing liquid is introduced into chamber 86 through nozzle 140 and then water is introduced into chamber 86 through nozzle 140. The water is operative to push the plasticized cheese upwardly in chamber 86 and through meshes 126 and 130.

Since certain changes may be made in the foregoing disclosure without departing from the scope of the invention herein involved, it is intended that all matter contained in the above description and depicted in the accompanying drawings be construed in an illustrative and not in a limiting sense.

What is claimed is:

1. A machine for producing a precipitated cheese from a milk containing liquid, said machine comprising:
    (a) a tank defining a chamber for receiving the milk containing liquid;
    (b) inlet means mounted to said tank for introducing and radially dispresing the milk containing liquid into said tank, the radially dispersed milk containing liquid at sufficiently high acidity and temperature for forming curd and whey as the milk as the milk containing liquid is dispersed, the curd rising in said chamber;
    (c) rotatable blade means horizontally disposed within said tank at an upper region thereof;
    (d) drive means connected to said blade means for rotating said blade means;
    (e) curd discharge means disposed within said tank at an upper region thereof below said blade means, said discharge means disposed internally and externally of the interior of said tank, said blade means operative to scoop the rising curd into said discharge means, said curd discharged from said tank through said discharge means;
    (f) whey outlet means at a bottom region of said tank;
    (g) sensor means for monitoring the flow rates of said curd in said discharge means and the milk containing liquid in said inlet means; and
    (h) valve means connected to said inlet means and said outlet means for controlling the rate at which the milk containing liquid is introduced into said tank, said rate corresponding to the rate at which said curd is discharged through said discharge means and said whey is discharged out of said tank through said outlet means.

2. The machine as claimed in claim 1 wherein said discharge means includes a funnel formed with a mouth, said mouth disposed substantially coplanar with a lower edge of said blade means, said curd scooped by said blade means falling into said mouth.

3. The machine as claimed in claim 1 wherein said rotable blade means includes at least one blade having a substantially C-shaped profile, said blade extending outwardly in a curve from a center region of said chamber towards an interior sidewall of said chamber.

4. The machine as claimed in claim 1 wherein said inlet means includes a nozzle disposed within said tank at a lower region thereof, said nozzle operative to radially disperse the milk containing liquid at the lower region of said tank.

5. The machine as claimed in claim 1 wherein said drive means is motor means having a shaft that extends into said chamber, a head mounted on a free end of said shaft, said blade means connected to said head.

6. The machine as claimed in claim 5 wherein said blade means includes a pair of blades the extend outwardly from said head.

7. The machine as claimed in claim 6 wherein each said blade has a substantially C-shaped profile in right cross section, said blades extend outwardly in a curved path from diametrially opposite locations on the periphery of said head, said blades defining an abbreviated spiral configuration.

8. A machine for producing a precipitated cheese from a milk containing liquid, said machine comprising:
    (a) a tank defining a chamber for receiving the milk containing liquid;
    (b) whey drain means at a lower region of said tank, said drain means configured to have whey flow therethrough;
    (c) a first container configured to hold the milk containing liquid;
    (d) a second container configured to hold an acidifying agent;
    (e) first means connected to said first and second container, the quantity of the milk containing liquid and acidifying agent flowing into said first means from said first and second containers is regulated by said first means, the milk containing liquid and the acidifying agent mixed in said first means to form an acidified milk containing liquid;
    (f) heater means operatively connected to said first means for heating the mixture of milk containing liquid and acidifying agent;
    (g) pump means connected to said first means and said heater means for pumping the acidified milk containing liquid from said first means to said heater means;

(h) first sensor means connected to said heater means for sensing the acidity and temperature fo the milk containing liquid;

(i) control means operatively connected to said first means and said sensor means for controlling the acidity and temperature of the milk containing liquid;

(j) inlet means mounted to said tank for introducing and radially dispersing the acidified milk containing liquid, the milk containing liquid at sufficiently high temperature and acidity to form precipitated solids which constitute cheese that rises in said tank, the milk containing liquid radially dispersed above said drain;

(k) second means connected to said inlet means and said drain means, said second means controlling the rate at which the milk liquid is introduced into said chamber through said inlet means and the rate at which they whey flows through said drain means;

(l) rotable blade means disposed at an upper region of said tank;

(m) discharge means disposed within said tank at an upper region thereof about an axis of rotation of said blade means, said discharge means disposed internally and externally of the interior of said tank below said blade means, said blade means operable to scoop the precipitated solids into said discharge means, said scooped solids dischaged from said tank through said discharge means; and (n) second sensor means for monitoring the flow rates of said scooped solids through said discharge means and the whey through said drain means, said first and second sensor means connected to said second means.

9. The machine as claimed in claim 8 wherein said discharge means includes a funnel formed with a mouth, said mouth disposed substantially coplanar with a lower edge of said blade means, said curd scooped by said blade means falling into said mouth.

10. The machine as claimed in claim 9 wherein said rotatable blade means includes at least a pair of baldes, each blade having a substantially C-shaped profile, each said blade extending outwardly in a curved path from a center region of said chamber towards an interior sidewall of said chamber.

* * * * *

UNITED STATES PATENT AND TRADEMARK OFFICE
CERTIFICATE OF CORRECTION

PATENT NO. : 4254698

DATED : March 10, 1981

INVENTOR(S) : Joseph Savarese

It is certified that error appears in the above—identified patent and that said Letters Patent is hereby corrected as shown below:

On the front page:

delete " [73] Assignee: Pozzolanic Limited, Chester, England"

after "Attorney, Agent, or Firm" delete "Friedman, Goodman & Teitelbaum" and insert in lieu thereof --Herbert L. Bello--

Signed and Sealed this

Fourth Day of August 1981

[SEAL]

Attest:

Attesting Officer

GERALD J. MOSSINGHOFF

Commissioner of Patents and Trademarks